US007046426B2

(12) United States Patent
Ng et al.

(10) Patent No.: US 7,046,426 B2
(45) Date of Patent: May 16, 2006

(54) METHOD FOR DETERMINING LOCATIONS AND GAIN SETTINGS OF AMPLIFIERS IN AN OPTICAL NETWORK

(75) Inventors: Eddie Kai Ho Ng, Ottawa (CA); Colin Geoffrey Kelly, Ottawa (CA)

(73) Assignee: Tropic Networks Inc., Kanata (CA)

( * ) Notice: Subject to any disclaimer, the term of this patent is extended or adjusted under 35 U.S.C. 154(b) by 296 days.

(21) Appl. No.: 10/443,058

(22) Filed: May 22, 2003

(65) Prior Publication Data

US 2004/0047028 A1 Mar. 11, 2004

Related U.S. Application Data

(60) Provisional application No. 60/407,986, filed on Sep. 5, 2002.

(51) Int. Cl.
*H01S 3/00* (2006.01)
*H04B 10/00* (2006.01)
(52) U.S. Cl. ........................................ 359/333; 398/160
(58) Field of Classification Search ................ 398/160; 359/333

See application file for complete search history.

(56) References Cited

U.S. PATENT DOCUMENTS 6,381,560 B1 * 4/2002 Shah et al. ..................... 703/2
2002/0187770 A1 * 12/2002 Grover et al. .............. 455/403

OTHER PUBLICATIONS

Abed et al. Optimizing Logical Topology of Lightwave Network Architecture (LNA) Using Genetic Algorithms. Computers and Communications. Mar. 27-29, 1996. pp. 501-507.*
Zhong et al. Optimization of Amplifier Placements in Switch-Based Optical Networks. Communications, 2001. Jun. 11-14, 2001. pp. 224-228. vol. 1.*
Yang et al. A Genetic Algorithm-Based Methodology for Optimizing Multiservice Convergence in a Metro WDM Network. Journal of Lightwave Technology, vol. 21, No. 5. May 2003.*
Ramaswami et al. Analysis of Effective Power Budget in Optical Bus and Star Networks Using Erbium-Doped Fiber Amplifiers. Journal of Lightwave Technology, vol. 11, No. 11, Nov. 1993.*

(Continued)

*Primary Examiner*—Deandra M. Hughes
(74) *Attorney, Agent, or Firm*—Victoria Donnelly

(57) ABSTRACT

A method for determining locations and gain settings of optical amplifiers in an optical network is provided. The method comprises evaluating allowable amplifier locations and successively eliminating selected locations until no further locations can be eliminated without the network violating predetermined specifications. This systematic method is applicable to a variety of network topologies and takes into account existing network limitations. In one embodiment, the method for determining the locations and gain settings of the amplifiers uses the amount of operating margin in the network to select locations to be eliminated. In another embodiment, the method is repeated a number of times with different selections of amplifier locations, and the method providing the arrangement with the least number of amplifiers is chosen.

18 Claims, 6 Drawing Sheets

OTHER PUBLICATIONS

Ramamurthy, B., et al, "Minimizing the Number of Optical Amplifiers Needed to Support a Multi-Wavelength Optical LAN/MAN", Proceedings of IEEE INFOCOM '97, pp. 261-268, 1997.

Li, Chung-Sheng, et al, "Gain Equalization in Metropolitan and Wide Area Optical Networks Using Optical Amplifiers", Proceedings of IEEE INFOCOM '94, pp. 130-137, 1994.

Ramamurthy, B., et al, "Optimizing Amplifier Placements in a Multiwavelength Optical LAN/MAN: The Equally Powered-Wavelengths Case", Journal of Lightwave Technology, vol. 16, pp. 1560-1569, Sep. 1998.

Fumagalli, A., et al, "Optimal Amplifier Placement in Multi-Wavelength Optical Networks Based on Simulated Annealing", Proceedings of the SPIE—The International Society for Optical Engineering, vol. 3531, pp. 268-279, 1998.

Ramamurthy, B., et al., "Optimizing Amplifier Placements in a Multi-Wavelength Optical LAN/MAN: The Unequally Powered-Wavelengths Case", IEEE/ACM Transactions on Networking, pp. 755-767, Dec. 1998.

* cited by examiner

METHOD FOR DETERMINING LOCATIONS AND GAIN SETTINGS OF AMPLIFIERS IN AN OPTICAL NETWORK

RELATED APPLICATIONS

This application claims priority from U.S. Provisional Patent Application to Ng et al. entitled "Method of Placement of an Amplifier in an Optical Network", Ser. No. 60/407,986 filed on 5 Sep. 2002.

FIELD OF THE INVENTION

The present invention relates generally to optical networks, and in particular to a method for determining locations and gain settings of amplifiers in optical networks.

BACKGROUND OF THE INVENTION

As development of long-haul networks begins to saturate the market and the demand for larger bandwidth in the networks starts to expose bottlenecks at the user-end, the focus of optical network development has shifted away from long-haul networks to smaller and more dynamic networks, such as metropolitan area networks (MANs). As a result, new network design and planning rules, for example, related to the placement of network components, have to be developed.

Specifically, determining the locations and gain settings of optical amplifiers in MANs is a new design issue that has arisen since the growth in the size of MANs has reached the degree that amplification has become necessary in MANs. However, many of the current amplifier placement methods do not attempt to optimize network parameters such as cost associated with amplifiers or optical signal to noise ratio (OSNR) of signals. As well, many amplifier placement methods are specific to a particular network topology, such as star or ring topologies, and cannot be applied to the more complex mesh topology.

For example, there exist methods of determining amplifier placement that are simple and methodical, as illustrated by the following two examples.

An article by Byrav Ramamurthy, Jason Iness, and Biswanath Mukherjee published in Proceedings of IEEE INFOCOM '97, pages 261–8, 1997 and entitled "Minimizing the Number of Optical Amplifiers Needed to Support a Multi-Wavelength Optical LAN/MAN" discloses two methods of determining amplifier placement, one termed the As Soon As Possible (ASAP) method, and the other termed the As Late As Possible (ALAP) method. Amplifier placement is determined solely by power levels along optical links in the network.

An article by Chung-Sheng Li, Franklin Fuk-Kay Tong, Christos J. Georgiou, and Monsong Chen published in Proceedings of IEEE INFOCOM '94, pages 130–7, 1994 and entitled "Gain Equalization in Metropolitan and Wide Area Optical Networks Using Optical Amplifiers" discloses a method of determining amplifier placement in the network by traversing the network in an upstream direction and placing amplifiers to maintain power levels at specific locations in the network.

These two methods described above do not attempt to minimize the number of amplifiers in the network, nor do they perform an assessment of the effectiveness of particular amplifier locations for the network as a whole.

Advanced methods of determining amplifier placement in a network involve formulating a mathematical equation for the amplifier placement and solving the equation, as is illustrated by the following three methods.

An article by Byrav Ramamurthy, Jason Iness, and Biswanath Mukherjee published in Journal of Lightwave Technology, volume 16, pages 1560–9, September 1998 and entitled "Optimizing Amplifier Placements in a Multiwavelength Optical LAN/MAN: The Equally Powered-Wavelengths Case", discloses a method of determining the minimum number and locations of optical amplifiers required in a network by solving the amplifier placement equation with a mixed-integer linear program (MILP) software package. This method is applicable only to star coupler-based networks and assumes the artificial constraint that the powers on the wavelengths at any given point in the network are equal.

An article by A. Fumagalli, G. Balestra, and L. Valcarenghi published in Proceedings of the SPIE—The International Society for Optical Engineering, volume 3531, pages 268–79, 1998 and entitled "Optimal Amplifier Placement in Multi-Wavelength Optical Networks Based on Simulated Annealing" discloses a method of determining the placement of optical amplifiers required in a network by solving the amplifier placement equation with a heuristic algorithm. This method is applicable only to broadcast-and-select networks.

An article by Byrav Ramamurthy, Jason Iness, and Biswanath Mukherjee published in IEEE/ACM Transactions on Networking, pages 755–67, December 1998 and entitled "Optimizing Amplifier Placements in a Multi-Wavelength Optical LAN/MAN: The Unequally-Powered-Wavelengths Case", discloses a method of determining the minimum number and locations of optical amplifiers required in a network by solving the amplifier placement equation with a nonlinear solver. This method is applicable only to star coupler-based networks.

In the above-mentioned methods, optical amplifier placements are unrestricted so that an optical amplifier may be placed at any location along the lightpaths of the network. In actuality, optical amplifiers must often placed into existing optical networks, and thus there exists the added constraint that optical amplifiers may only be placed at easily accessible locations along the lightpaths of the network. The above-mentioned methods do not include this constraint.

Therefore, there is a need in the industry for the development of a method and system for determining the locations and gain settings of optical amplifiers in an optical network that would attempt to optimize the placement, be applicable to a variety of network topologies, and take into account additional factors and existing network limitations such as amplifier cost and location restrictions.

SUMMARY OF THE INVENTION

Therefore there is an object of the invention to provide a method for determining the locations and gain settings of optical amplifiers in an optical network that would avoid or minimize the above-mentioned drawbacks.

According to one aspect of the invention, there is provided a method for determining the location of one or more optical amplifiers in an optical network, comprising the steps of:

(a) determining allowable locations for amplifiers in the network;

(b) for each allowable amplifier location, introducing and determining an amplifier location object comprising an effective margin for the amplifier location, the effective margin being an available operating margin in the network, which has all other amplifiers except for the amplifier for which the amplifier location object is being determined, the operating margin in the network being a difference between an operating value of a selected network parameter and a threshold value of said parameter for the network; and (c) eliminating locations for amplifiers based on said effective margin until no further locations can be eliminated without the network violating predetermined specifications.

The method described above has been implemented in the first embodiment of the invention.

Beneficially, the step of determining the effective margin may comprise determining the effective margin as a function of one of the following:

an optical signal to noise ratio (OSNR) margin ($OSNR_{margin}$);
power margin ($P_{rx\ margin}$); and
the optical signal to noise ratio (OSNR) margin ($OSNR_{margin}$) and the power margin ($P_{rx\ margin}$).

The function may be, for example, $$\sqrt{((P_{RXmargin})^2 + (OSNR_{margin})^2}.$$

Additionally, the step (c) of eliminating the amplifier location may comprise eliminating the amplifier location that has the highest effective margin. Furthermore, it may comprise determining the predetermined specifications as one or more of the following:

a required optical signal to noise ratio (OSNR);
a required optical signal power; and
an allowable optical signal bit error rate.

Also, the step (a) of determining allowable locations may comprise determining allowable locations for amplifiers in the network, which includes protection lightpaths and reconfigurable lightpaths.

In a modification to the method of the first embodiment of the invention, the step of introducing and determining the amplifier location object comprises introducing and determining the amplifier location object, comprising the gain setting of the amplifier. The method may also further comprise the step of determining gains of the amplifiers whose locations have not been eliminated.

In addition, the step of determining gains may comprise adjusting said gain settings of amplifiers in the network so that the powers of optical signals on different wavelengths at the amplifiers are equal. Optionally, the step of adjusting gain settings may further comprise adjusting power of the optical signals that pass through the amplifiers.

In another modification to the method of the first embodiment of the invention, the step of introducing and determining the amplifier location object comprises introducing and determining the amplifier location object, comprising a critical status, indicating the necessity of placing the amplifier at the allowable location in the network for the network to meet the predetermined specifications.

As well, the step of introducing and determining the amplifier location object, comprising the critical status, may comprise defining the critical status as a Boolean variable having values of "critical" and "not critical", the Boolean variable being "critical" when the eliminating of the amplifier location results in the network not meeting the predetermined specifications. Moreover, this step of introducing and determining the amplifier location object may comprise:

(i) selecting an amplifier location object whose critical status is "not critical";

(ii) calculating the amplifier gain settings associated with said amplifier location object and power of the optical signal to be passing through the amplifier;

(iii) verifying whether said gain settings and the optical signal power meet the predetermined network specifications;

(iv) if no, setting the critical status of said amplifier location object to "critical" and proceeding to the step (vi);

(v) if yes, calculating the effective margin for the amplifier location and determining the critical status of said amplifier location object; and (vi) repeating the steps (i) to (v) until the critical statuses of all amplifier location objects are "critical".

According to another aspect of the invention, implemented as a second embodiment of the invention, there is provided a method for determining the location and gain setting of one or more amplifiers in an optical network, comprising the steps of:

(d) executing the method as described in claim 1;
(e) repeating the step (d) required number of times;
(f) comparing the total number of amplifiers for which locations have been determined in different methods executed in the steps (d) and (e); and
(g) choosing the method that provides the least number of amplifiers.

Beneficially, the step (d) of executing the methods may comprise eliminating the amplifier location whose amplifier location object that has the highest effective margin.

In a modification to the second embodiment of the invention, the step (d) of executing the method comprises eliminating the amplifier location whose amplifier location object is chosen from a subset of the amplifier location objects.

Additionally, the step (d) of executing the method may comprise defining the subset of amplifier location objects as the subset with the highest effective margins.

If required, the method may further comprise storing all calculated values.

The methods for determining the locations and gain settings of optical amplifiers in an optical network of the embodiments of the invention provide a systematic procedure that provides the placement of amplifiers in the network, is applicable to a variety of network topologies, and takes into account additional factors and existing network limitations such as amplifier cost and location restrictions.

BRIEF DESCRIPTION OF THE DRAWINGS

Embodiments of the invention will now be described, by way of example, with reference to the accompanying drawings in which.

DETAILED DESCRIPTION OF PREFERRED EMBODIMENTS

Figure 1:
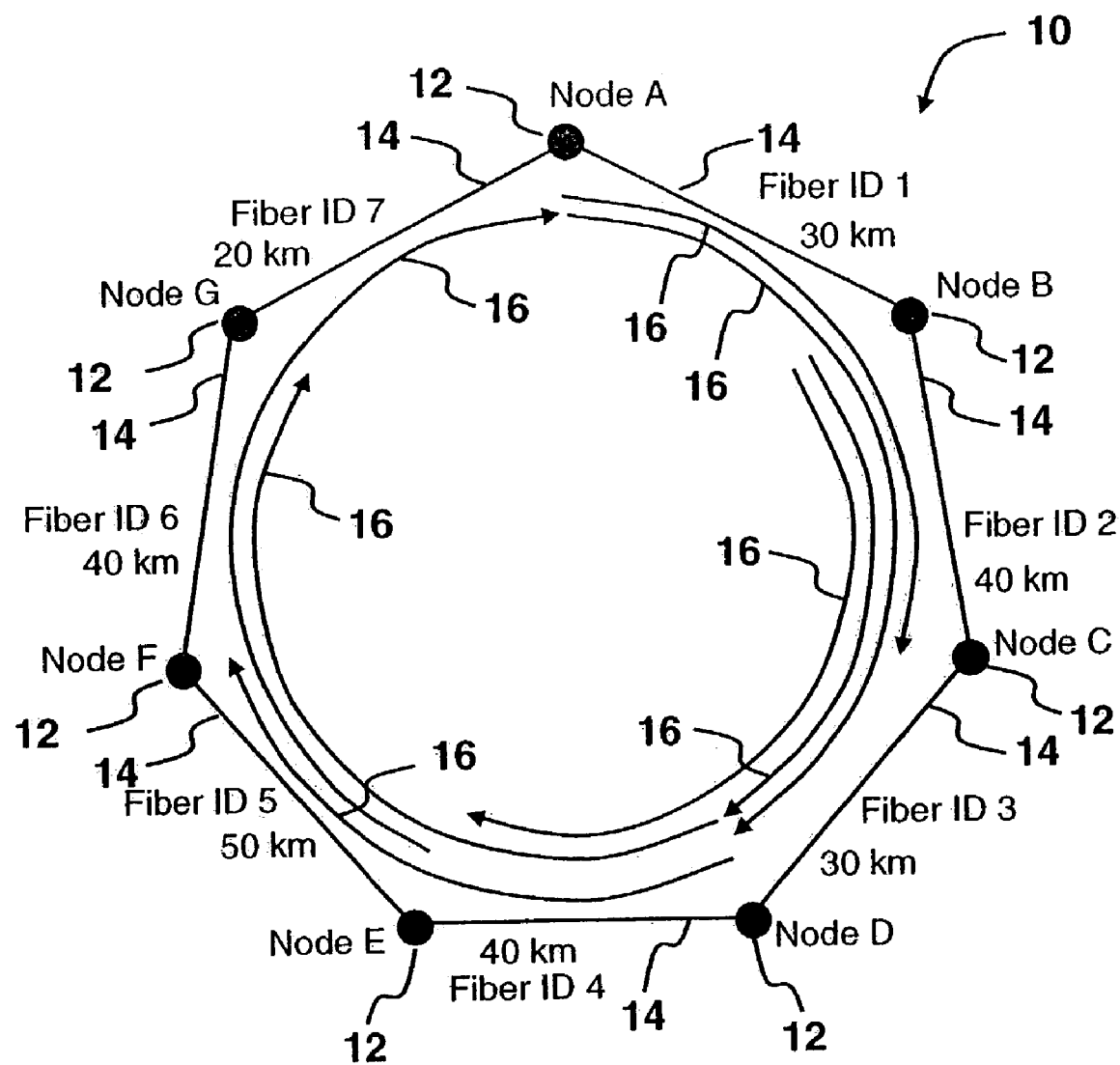
FIG. 1 is an exemplary optical network used for illustrating methods for determining the locations and gain settings of optical amplifiers according to embodiments of the invention.

An exemplary optical network 10 is illustrated in FIG. 1 as comprising a plurality of, in this example seven, nodes 12 identified individually as Nodes "A" through "G" (namely, nodes "A", "B", "C", "D", "E", "F", "G"), which are coupled together via fiber spans 14 identified individually by the fiber identification numbers (Fiber IDs) "1" through "7" and represented by straight solid lines. Lightpaths 16 are represented by curved solid lines with arrows indicating the direction of a network signal traveling from a source node to a destination node.

As is known in the art, such an optical network may include an arbitrary number of nodes 12 and lightpaths 16, and each of the fiber spans 14 may have different lengths and thus different dispersions. Also, such an optical network 10 may have other arrangements of nodes 12 and other lightpaths 16 through the nodes 12, such as mesh or star topologies. Accordingly, FIG. 1 serves merely to illustrate one form of optical network for the purpose of describing embodiments of the invention.

Figure 2:
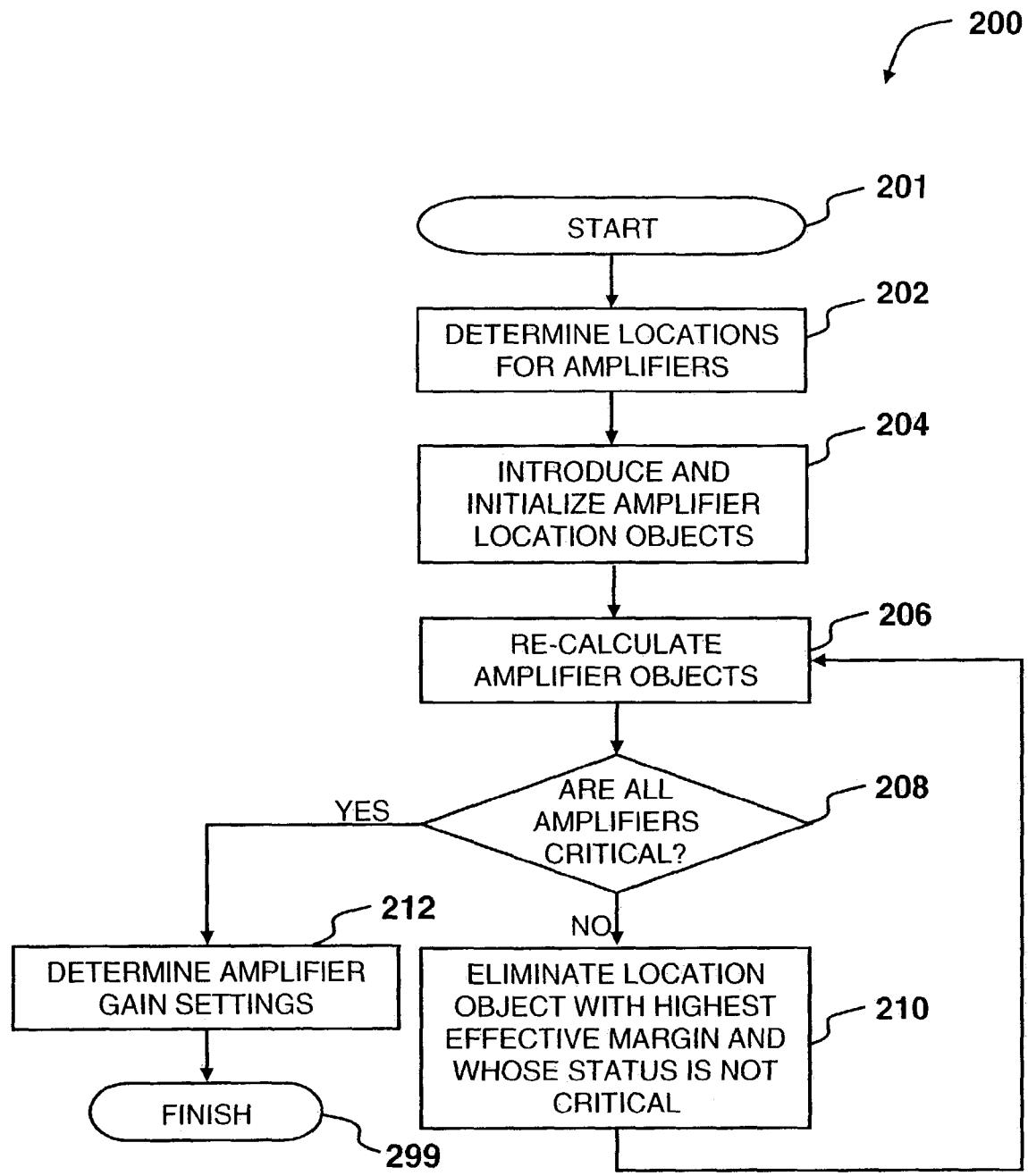
FIG. 2 is a flowchart illustrating the steps of the method for determining the locations and gain settings of optical amplifiers according to a first embodiment of the invention.

FIG. 2 is a flowchart 200 illustrating the steps of the method for determining the location of amplifiers in the optical network 10 according to the first embodiment of the invention.

Upon start 201, the procedure 200 determines the allowable locations for amplifiers in the network 10 (step 202). Allowable locations are those locations where optical amplifiers may be placed, and they may be determined, for example, based on ease of accessibility to the locations. Central offices and amplifier huts are generally allowable locations for amplifiers in the network 10.

After determining the allowable locations for amplifiers (step 202), the flowchart 200 proceeds with introducing and initializing an "amplifier location object" for each of the allowable amplifier locations (step 204). "Amplifier location objects" store an effective margin, a critical status, and a gain setting parameters for the amplifier.

The purpose of the critical status is to specify whether an amplifier is necessary at the specified location in order for the optical network 10 to meet predetermined specifications. The critical status may, for example, be a Boolean variable having values of "critical", when the eliminating of the amplifier location results in the network not meeting the predetermined specifications, and "not critical" otherwise. The predetermined specifications may, for example, be a minimum optical signal to noise ratio (OSNR), a minimum signal power level, or a maximum signal error rate.

The effective margin is the available operating margin in the network having all other amplifiers except for the amplifier in the network for which the amplifier location object is being determined, the operating margin in the network being a difference between an operating value of a selected network parameter and a threshold value of said parameter for the network. The effectiveness margin may be defined as, for example, the average OSNR margin ($OSNR_{margin}$) or the average power margin ($P_{rx\ margin}$) of the network, or a function of both of these values, such as $\sqrt{((P_{RXmargin})^2+(OSNR_{margin})^2}$.

The gain setting is that of the amplifier at the specified amplifier location.

Conveniently, the "amplifier location objects" may be initialized to the values of "not critical" for the critical status, zero for the effective margin, and maximum amplification for the amplification value.

Following the step 204, the procedure 200 recalculates the values stored in the amplifier location objects (step 206). Recalculating the values in the amplifier location objects (step 206) comprises the steps illustrated in FIG. 2A of selecting an amplifier location object that is "not critical" (step 206*a*), evaluating the network having amplifiers at all locations with existing location objects, except at the location associated with the location object selected in the step 206*a* (steps 206*b* to 206*e*), checking whether there are more amplifier locations objects that are "not critical" (step 206*f*), and if there are (exit "Yes" from step 206*f*) then returning to the step 206*a* of selecting the next amplifier location object that is "not critical". If there are not more location objects that are "not critical" (exit "No" from the step 206*f*) then the method proceeds to the step 208.

Evaluating the network (steps 206*b* to 206*e*) comprises the steps of adjusting signal and gain settings to ensure certain network operating conditions (step 206*b*), examples of which are given below, checking whether the step 206*b* of adjusting was successful in ensuring the certain network operating conditions (step 206*c*), and if it was not successful (exit "No" from step 206*c*) then setting the critical status of the location object to "critical" (step 206*g*), setting the effective margin to a default value of, for example "0", and proceeding to the step 206*f*. If it was successful (exit "Yes" from step 206*c*) then the method calculates the effective margin in the network (step 206*d*), and determines the critical status of the amplifier location (step 206*e*). The network operating conditions that the network must operate within may be, for example, maximum and minimum signal powers.

After recalculating the amplifier location objects (step 206), the procedure 200 checks whether the critical statuses of all amplifier location objects are "critical" (step 208). If all statuses are critical (exit "Yes" from the step 208), then the procedure 200 determines the amplifier gain settings for each of the amplifier location objects (step 212) for the network 10 having amplifiers at all locations with associated location objects, and the procedure 200 is finished (step 299). If not all statuses are "critical" (exit "No" from the step 208), then the method 200 proceeds to the step 210.

In the step 210, the procedure 200 eliminates the amplifier location object whose effective margin is the highest and whose critical status is "not critical" and returns to the step 206 of recalculating the amplifier location objects.

The method of the first embodiment of the invention is applied to the exemplary optical network 10. Upon start 201, the procedure 200 determines the allowable locations for amplifiers in the network 10 (step 202). In this example, they are determined to be the source and destination ends of each fiber span 14.

Figure 3:
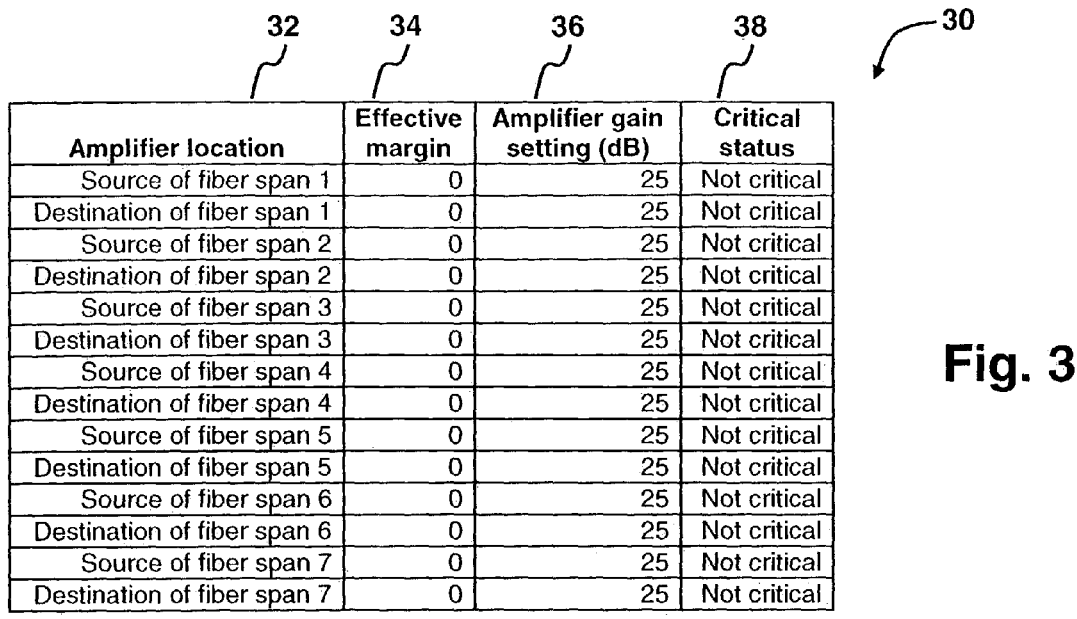
FIG. 3 shows a table of amplifier placement objects of the optical network of FIG. 1 introduced and initialized in the step 204 of FIG. 2.

The procedure 200 then introduces and initializes an "amplifier location object" for each of the allowable amplifier locations (step 204). FIG. 3 shows a table 30 of amplifier location objects of the optical network 10 of FIG. 1 introduced and initialized in the step 204 of FIG. 2. Each row in the table 30 corresponds to an amplifier location object. For example, the first row of the table 30 in FIG. 3 is an amplifier location object for the amplifier location 32 "source of fiber span 1". The amplifier location objects are initialized to the values of "not critical" for the critical status 38, "0" for the effective margin 34, and maximum amplification, which in this example is "25 dB" for the amplifier gain setting 36.

Figure 2A:
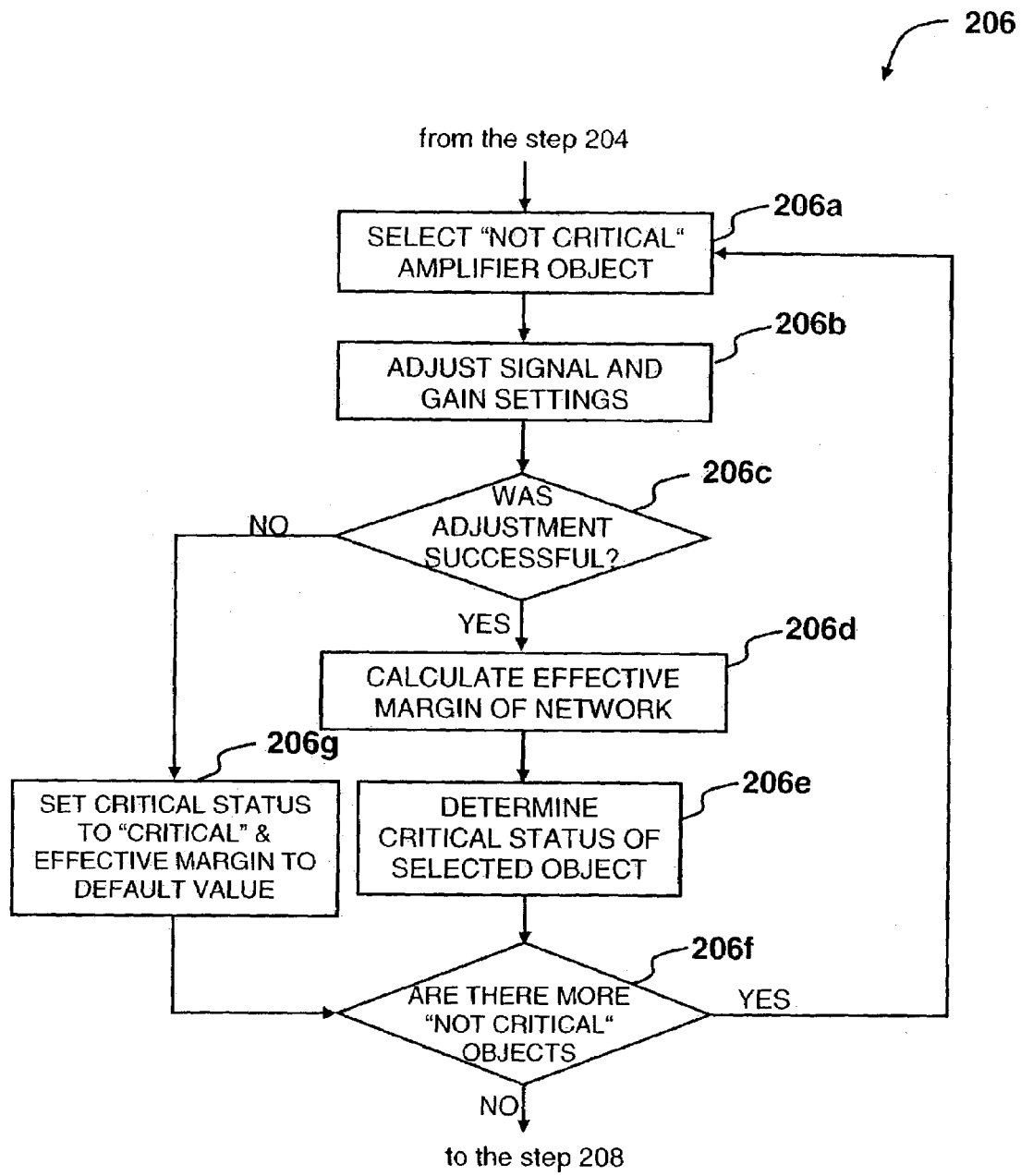
FIG. 2A is a flowchart illustrating the step 206 of recalculating the amplifier location objects in the method of FIG. 2 in more detail.
Figure 4:
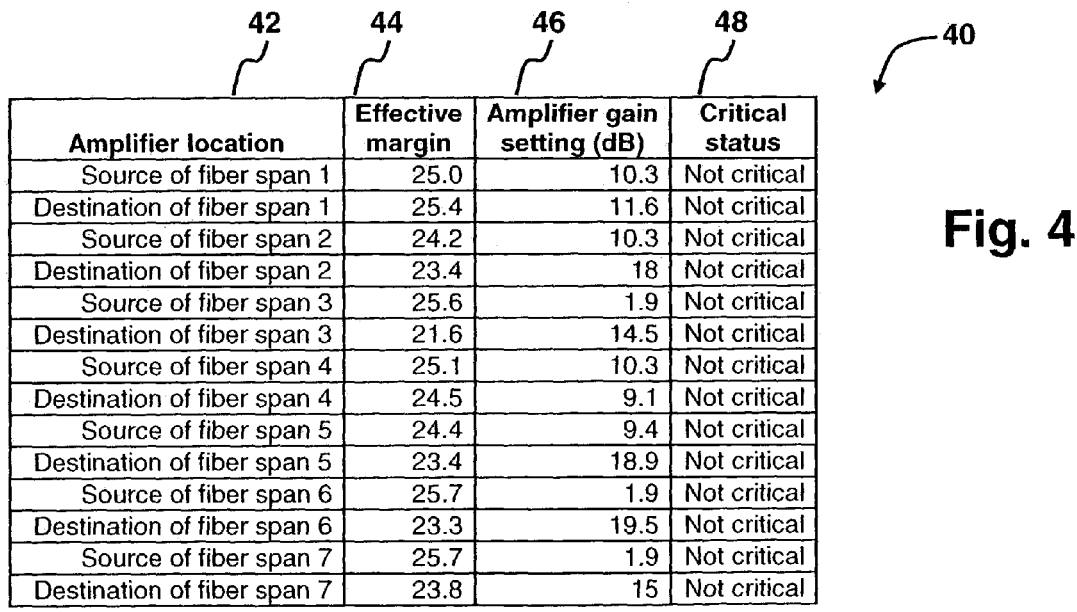
FIG. 4 shows the table of amplifier placement objects of the optical network of FIG. 1 recalculated in the step 206 of FIG. 2.

The procedure 200 recalculates the values stored in the amplifier location objects (step 206) following the steps illustrated in FIG. 2A. The result is the table 40 of amplifier location objects illustrated in FIG. 4. The amplifier location object with the highest effective margin 44 is then eliminated (step 210). In this example, the amplifier location object with amplifier location 42 "source of fiber span 7" has the highest effective margin 44 with a value of "25.7", thus it is eliminated (step 210) and the amplifier location objects are recalculated (step 206), producing the table 50 of FIG. 5.

Figure 5:
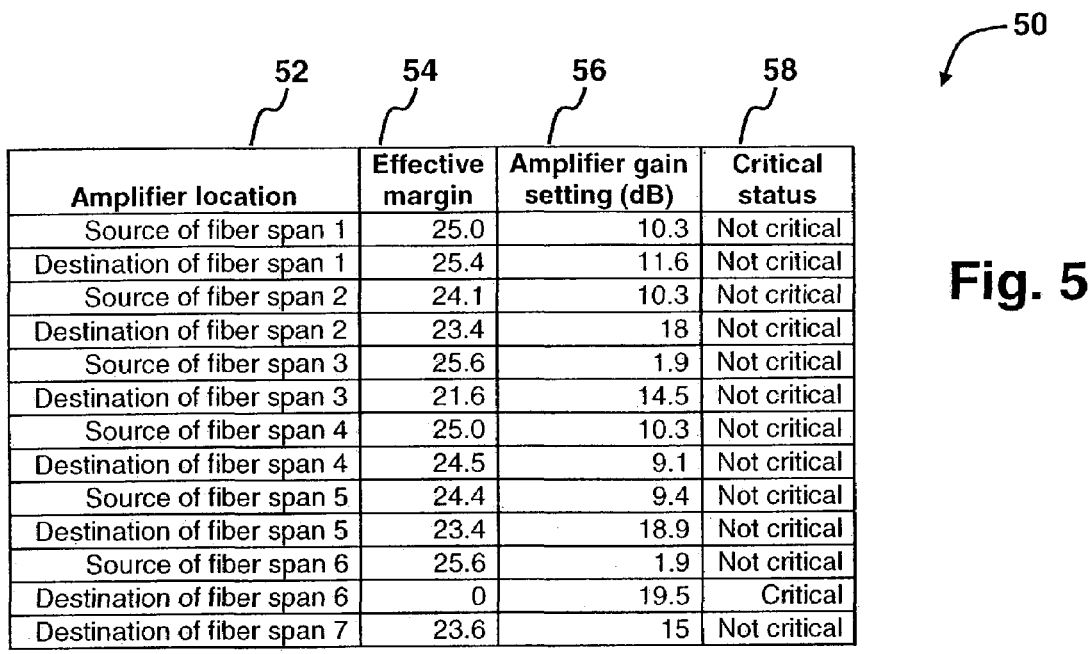
FIG. 5 shows the table of amplifier placement objects of the optical network of FIG. 1 determined in the step 206 of FIG. 2.

FIG. 5 shows a table 50 of amplifier location objects recalculated in the steps 206a to 206f of FIG. 2A. The location object with amplifier location 50 "destination of fiber span 6" has a critical status 58 of "critical" and effective margin 54 of "0" set in the step 206g of FIG. 2A.

Figure 6:
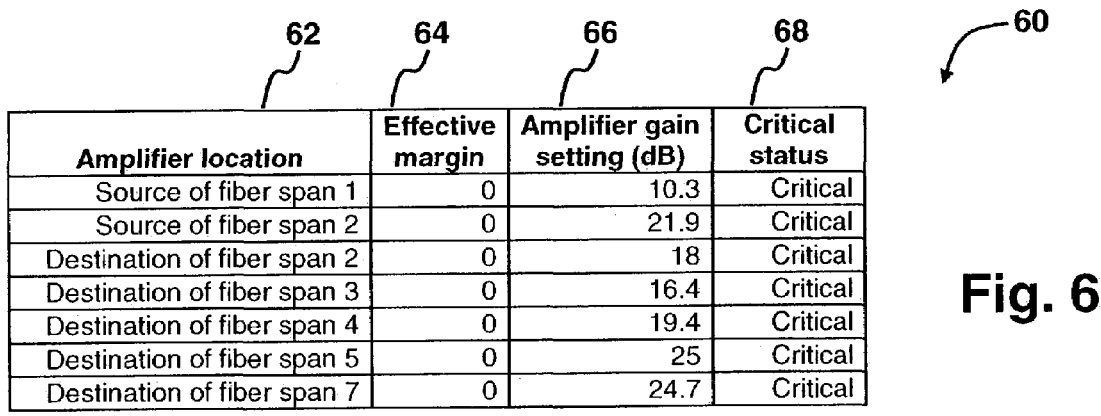
FIG. 6 shows the table of amplifier placement objects whose amplifier gain settings were determined in the step 212 of FIG. 2.

The steps 206 to 210 are repeated until no further locations can be eliminated without the network violating predetermined specifications, i.e. all amplifier location objects have a critical status 38 of "critical". FIG. 6 shows the final table 60 of amplifier location objects of the optical network 10 of FIG. 1 with all critical statuses 38 having the value "critical".

Thus, a method for determining the location and value of amplifiers in an optical network is provided that is expeditious, may be applicable to a variety of network topologies, and considers existing network limitations.

This method may also be applied to bidirectional networks in which nodes are connected by two spans of fiber, each fiber span carrying a network signal traveling in opposite directions. These two fiber spans between nodes may be of different lengths, so that the amplifier placement method must be performed twice, once on the network that carries signals traveling in one direction, and once on the network that carries signals traveling in the opposite direction.

Furthermore, this method may be applied to protected networks having additional fiber spans forming protection lightpaths between nodes, and to reconfigurable networks having multiple reconfigurable lightpaths between nodes. In the step 202, the protection lightpaths and the reconfigurable lightpaths are included-along with the working lightpaths when determining locations for amplifiers in the network. Thus the method ensures that all lightpaths, including the protected lightpaths and reconfigurable lightpaths, meet network operating conditions.

Figure 7:
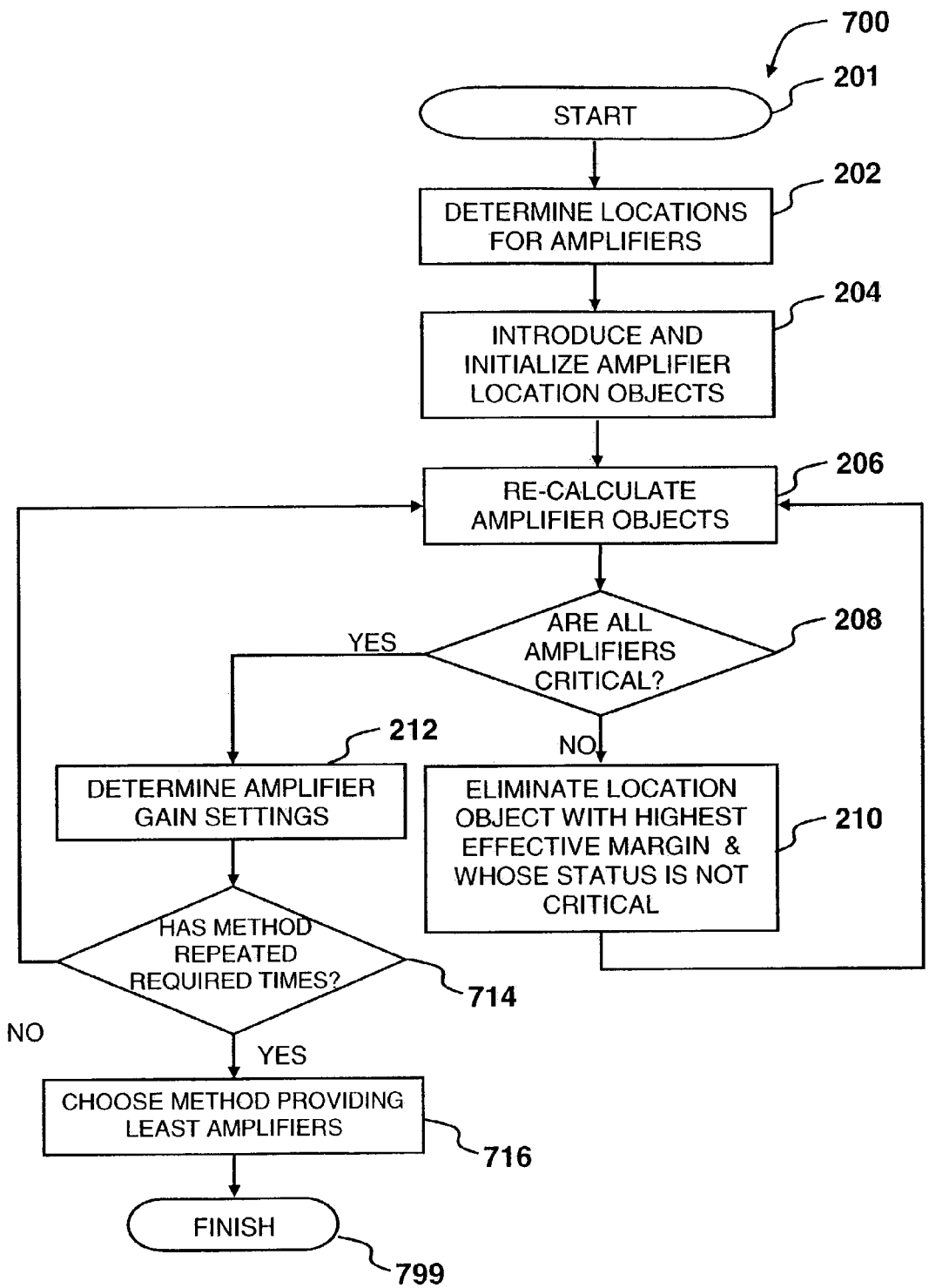
FIG. 7 is a flowchart illustrating the steps of the method for determining the locations and gain settings of optical amplifiers according to a second embodiment of the invention.

FIG. 7 is a flow chart illustrating the steps of the method for determining the location of amplifiers in the optical network 10 according to the second embodiment of the invention.

According to the second embodiment of the invention, the procedure 700 is similar to the procedure 300 of FIG. 3 and comprises repeating the procedure 200 of FIG. 2 a required number of times, with the addition of steps 714 and 716. In the step 714, the procedure checks whether the method has been repeated the required number of times. If it has not (exit "No" from the step 714), then the procedure returns to the step 206 of recalculating the amplifier location objects. If it has (exit "Yes" from the step 714), then the procedure compares the total number of the amplifier locations provided by the repeated execution of the procedure 200 and chooses the method providing the least number of amplifier locations (step 716).

In a modification to the method of the second embodiment, the step 210 of eliminating the location whose location object has the highest effective margin comprises eliminating the location whose location object is chosen from a subset of the amplifier location objects in the network. The subset of amplifier location objects of the step 210 of the second embodiment of the invention may be a fraction, for example half, of all amplifier location objects. Beneficially, the subset of amplifier location objects may be the half of all amplifier location objects that have the highest effective margins. It would also reduce processing time to store all calculated values, such as gain settings and effective margins, rather than update to them in the step 206, so that the values may be reused when repeating the procedure 200.

Thus, a method for determining the locations and gain settings of optical amplifiers in an optical network is provided which is applicable to a variety of network topologies and takes into account existing network limitations.

It is apparent to those skilled in the art that there are many variations of the present invention that retain the spirit of the invention. Thus it is intended that the present invention cover the modifications, variations, and adaptations of this invention provided they fall within the scope of the following claims.

What is claimed is:

1. A method for determining the location of one or more amplifiers in an optical network, comprising the steps of:
    (a) determining allowable locations for amplifiers in the network;
    (b) for each allowable amplifier location, introducing and determining an amplifier location object comprising an effective margin for the amplifier location, the effective margin being an available operating margin in the network, which has all other amplifiers except for the amplifier for which the amplifier location object is being determined, the operating margin in the network being a difference between an operating value of a selected network parameter and a threshold value of said parameter for the network;
    (c) successively eliminating locations for amplifiers based on said effective margin until no further locations can be eliminated without the network violating predetermined specifications.

2. A method as described in claim 1, wherein the step of determining the effective margin comprises determining the effective margin as a function of one of the following:
    an optical signal to noise ratio (OSNR) margin ($OSNR_{margin}$);
    power margin ($P_{rx\ margin}$) and
    the optical signal to noise ratio (OSNR) margin ($OSNR_{margin}$) and the power margin ($P_{rx\ margin}$).

3. A method as described in claim 2, wherein the step of determining the effective margin comprises determining the effective margin as being equal to $\sqrt{((P_{RXmargin3})^2+(OSNR_{margin})^2}$.

4. A method as described in claim 1, wherein the step (c) of eliminating the amplifier location comprises eliminating the amplifier location that has the highest effective margin.

5. A method as described in claim 4, wherein the step of eliminating comprises determining the predetermined specifications as one or more of the following:
    a required optical signal to noise ratio (OSNR);
    a required optical signal power; and
    an allowable optical signal bit error rate.

6. A method as described in claim 1, wherein the step of introducing and determining the amplifier location object comprises introducing and determining the amplifier location object, comprising the gain setting of the amplifier.

7. A method as described in claim 6, further comprising the step of determining gains of the amplifiers whose locations have not been eliminated.

8. A method as described in claim 7, wherein the step of determining gains comprises adjusting said gain settings of amplifiers in the network so that the powers of optical signals on different wavelengths at the amplifiers are equal.

9. A method as described in claim 8, wherein the step of adjusting gain settings further comprises adjusting power of the optical signals that pass through the amplifiers.

10. A method as described in claim 1, wherein the step of introducing and determining the amplifier location object comprises introducing and determining the amplifier location object, comprising a critical status, indicating the necessity of placing the amplifier at the allowable location in the network for the network to meet the predetermined specifications.

11. A method as described in claim 10, wherein the step of introducing and determining the amplifier location object, comprising the critical status, comprises defining the critical status as a Boolean variable having values of "critical" and "not critical", the Boolean variable being "critical" when the eliminating of the amplifier location results in the network not meeting the predetermined specifications.

12. A method as described in claim 11, wherein the step (c) of successively eliminating locations for amplifiers, comprises:
   (i) selecting an amplifier location object whose critical status is "not critical";
   (ii) calculating the amplifier gain settings associated with said amplifier location object and power of the optical signal to be passing through the amplifier;
   (iii) verifying whether said gain settings and the optical signal power meet the predetermined network specifications;
   (iv) if no, setting the critical status of said amplifier location object to "critical" and proceeding to the step (vi);
   (v) if yes, calculating the effective margin for the amplifier location and determining the critical status of said amplifier location object; and
   (vi) repeating the steps (i) to (v) until the critical statuses of all amplifier location objects are "critical".

13. A method as described in claim 1, wherein the step (a) of determining allowable locations comprises determining allowable locations for amplifiers in the network, which includes protection lightpaths and reconfigurable lightpaths.

14. A method for determining the location and gain setting of one or more amplifiers in an optical network, comprising the steps of:
   (d) executing the method as described in claim 1;
   (e) repeating the step (d) required number of times;
   (f) comparing the total number of amplifiers for which locations have been determined in different methods executed in the steps (d) and (e); and
   (g) choosing the method that provides the least number of amplifiers.

15. A method as described in claim 14, wherein the step (d) of executing the methods comprises eliminating the amplifier location whose amplifier location object that has the highest effective margin.

16. A method as described in claim 14, wherein the step (d) of executing the method comprises eliminating the amplifier location whose amplifier location object is chosen from a subset of the amplifier location objects.

17. A method as claimed in claim 14, wherein the step (d) of executing the method comprises defining the subset of amplifier location objects as the subset with the highest effective margins.

18. A method as claimed in claim 17, further comprising storing all calculated values.

* * * * *